US011173785B2

(12) United States Patent
Mianzo et al.

(10) Patent No.: US 11,173,785 B2
(45) Date of Patent: Nov. 16, 2021

(54) OPERATOR ASSISTANCE VISION SYSTEM

(71) Applicant: Caterpillar Inc., Peoria, IL (US)

(72) Inventors: Lawrence Andrew Mianzo, Pittsburgh, PA (US); Michael Hoffelder, Norwich, NY (US)

(73) Assignee: Caterpillar Inc., Peoria, IL (US)

( * ) Notice: Subject to any disclaimer, the term of this patent is extended or adjusted under 35 U.S.C. 154(b) by 693 days.

(21) Appl. No.: 15/828,571

(22) Filed: Dec. 1, 2017

(65) Prior Publication Data
US 2019/0168609 A1 Jun. 6, 2019

(51) Int. Cl.
| | | |
|---|---|---|
| *B60K 35/00* | (2006.01) | |
| *E02F 9/26* | (2006.01) | |
| *G06T 19/00* | (2011.01) | |
| *B60W 50/08* | (2020.01) | |
| *G06K 9/00* | (2006.01) | |
| *B60W 50/14* | (2020.01) | |

(52) U.S. Cl.
CPC ............ *B60K 35/00* (2013.01); *B60W 50/08* (2013.01); *E02F 9/261* (2013.01); *E02F 9/264* (2013.01); *G06K 9/00* (2013.01); *G06K 9/00771* (2013.01); *G06K 9/00805* (2013.01); *G06T 19/00* (2013.01); *B60K 2370/152* (2019.05); *B60K 2370/177* (2019.05); *B60K 2370/179* (2019.05); *B60W 2050/146* (2013.01); *B60Y 2400/92* (2013.01); *G06T 2210/12* (2013.01)

(58) Field of Classification Search
None
See application file for complete search history.

(56) References Cited

U.S. PATENT DOCUMENTS

| | | | |
|---|---|---|---|
| 6,791,563 B2 | 9/2004 | Bragg et al. | |
| 8,233,045 B2 | 7/2012 | Luo et al. | |
| 8,705,796 B2 | 4/2014 | Ogata et al. | |
| 9,251,425 B2 | 2/2016 | Datta et al. | |
| 9,672,620 B2 | 6/2017 | Xu et al. | |
| 9,674,490 B2 | 6/2017 | Koravadi | |
| 9,734,553 B1 * | 8/2017 | Naware | G06Q 30/0643 |

(Continued)

FOREIGN PATENT DOCUMENTS

JP 2016219864 12/2016

*Primary Examiner* — Russell Frejd
*Assistant Examiner* — Demetra R Smith-Stewart
(74) *Attorney, Agent, or Firm* — Perkins Coie LLP

(57) ABSTRACT

A vision system for assisting an operator of a machine is provided. An image capturing device, mounted on the machine, is configured to capture an image of an environment of the machine. The vision system includes a controller configured to apply an object detection process to detect an object in the image. The controller determines a bounding box comprising one or more pixels associated with the object. The controller determines a height and a range associated with the object based on the bounding box. The controller extracts the one or more pixels within the bounding box. The controller is further configured to generate a three-dimensional (3D) view comprising the object based on the image captured by the image capturing device. The controller reinserts the one or more pixels as a vertical pop-up element with respect to a ground plane in the 3D view. A display is provided to display the 3D view to the operator of the machine.

20 Claims, 12 Drawing Sheets

(56) References Cited

U.S. PATENT DOCUMENTS

| | | | |
|---|---|---|---|
| 2009/0129630 A1* | 5/2009 | Gloudemans | G06T 15/20 |
| | | | 382/103 |
| 2009/0315978 A1* | 12/2009 | Wurmlin | G06T 7/20 |
| | | | 348/43 |
| 2012/0075343 A1* | 3/2012 | Chen | G09G 5/397 |
| | | | 345/633 |
| 2013/0243306 A1* | 9/2013 | Falco, Jr. | G06T 19/006 |
| | | | 382/154 |
| 2014/0160293 A1* | 6/2014 | Ristivojevic | G08B 13/19682 |
| | | | 348/150 |
| 2014/0200863 A1* | 7/2014 | Kamat | G01C 15/00 |
| | | | 703/1 |
| 2014/0267688 A1 | 9/2014 | Aich et al. | |
| 2014/0354813 A1 | 12/2014 | Ishimoto | |
| 2015/0084755 A1 | 3/2015 | Chen et al. | |
| 2015/0326925 A1* | 11/2015 | Ozkan | H04N 21/858 |
| | | | 725/36 |
| 2016/0012303 A1 | 1/2016 | Jung et al. | |
| 2016/0065944 A1 | 3/2016 | Fujii et al. | |
| 2017/0061689 A1* | 3/2017 | Petrany | G06T 19/006 |
| 2019/0147600 A1* | 5/2019 | Karasev | G06T 17/20 |
| | | | 382/107 |

* cited by examiner

OPERATOR ASSISTANCE VISION SYSTEM

TECHNICAL FIELD

The present disclosure relates to systems and methods for assisting an operator of a machine. More specifically, the present disclosure relates to a system and a method for assisting the operator in visualizing objects present in an environment of the machine.

BACKGROUND

Machines such as, for example, wheel loaders, off-highway haul trucks, excavators, motor graders, and other types of earth-moving machines are used to perform a variety of tasks. Some of these tasks involve intermittently moving between and stopping at certain locations within a worksite. The worksite may have various objects that may provide hindrance in the movement of the machines within the worksite. The objects may comprise human, animals or other objects such as another machine, vehicles, tree, etc.

Generally, the machines have on board image capturing devices that may generate images of the environment of the machines. These images are processed by a controller, based on conventional object detection processes, which detects the presence of such objects in the environment of the machine. The images are presented to an operator on a display mounted in an operator cabin. The captured two-dimensional images can also be converted into an overhead view image or video, such as, from a bird's eye view, for greater visibility and control. However, the conventional techniques for generating such views often result in loss of information pertaining to the objects and their positioning in the view. For example, it is difficult for the operator to perceive depth of the objects in the view as the vertical objects are often distorted. Moreover, such views often fail to draw attention of the operator of the machine towards the detected object. The operator may be distracted due to various types of information presented on the display.

U.S. Pat. No. 8,233,045 (hereinafter the '045 reference) describes an image enhancing system for a vehicle. The image enhancing system comprises a display unit for displaying modified images and an imaging device for receiving captured images that are enhanced by the image enhancing system. The image enhancing system further includes an image enhancing module to enhance pixels located in the captured images via a transfer operation. However, the '045 reference, does not disclose assisting the operator of the vehicle with respect to an object detected in the environment of the machine.

SUMMARY

In an aspect of the present disclosure, a vision system for assisting an operator of a machine is provided. The vision system includes an image capturing device mounted on the machine. The image capturing device is configured to capture an image of an environment of the machine. The vision system includes a controller communicably coupled to the image capturing device. The controller is configured to apply an object detection process to detect an object in the image. The controller is configured to determine a bounding box comprising one or more pixels associated with the object. The controller is configured to determine a height and a range associated with the object based on the bounding box. The controller is configured to extract the one or more pixels within the bounding box. The controller is configured to generate a three-dimensional (3D) view comprising the object based on the image captured by the image capturing device. The controller is configured to reinsert the one or more pixels as a vertical pop-up element with respect to a ground plane at a location of the object in the 3D view. The vision system further includes a display communicably coupled to the controller. The display is configured to display the 3D view comprising the object to the operator of the machine.

In another aspect of the present disclosure, a method for assisting the operator of the machine is provided. The image capturing device mounted on the machine is configured to capture the image of the environment of the machine. The method includes applying, by a controller, an object detection process to detect an object in the image. The method includes determining, by the controller, a bounding box comprising one or more pixels associated with the object. The method includes determining, by the controller, a height and a range associated with the object based on the bounding box. The method includes extracting, by the controller, the one or more pixels within the bounding box. The method includes generating, by the controller, a three-dimensional (3D) view comprising the object based on the image captured by the image capturing device. The method includes reinserting, by the controller, the one or more pixels as a vertical pop-up element with respect to a ground plane at a location of the object in the 3D view.

In yet another aspect of the present disclosure, a computer-program product for use in conjunction with an image capturing device and a display is disclosed. The image capturing device is configured to capture an image of an environment of the machine. The computer-program product comprises a non-transitory computer-readable storage medium having instructions for causing a processor to apply an object detection process to detect an object in the image. The processor is configured to determine a bounding box comprising one or more pixels associated with the object. The processor is configured to determine a height and a range associated with the object based on the bounding box. The processor is configured to extract the one or more pixels associated with the object from the image. The processor is configured to generate a three-dimensional (3D) view comprising the object based on the image captured by the image capturing device. The processor is configured to reinsert the one or more pixels as a vertical pop-up element with respect to a ground plane at a location of the object in the 3D view.

DETAILED DESCRIPTION

Figure 1:
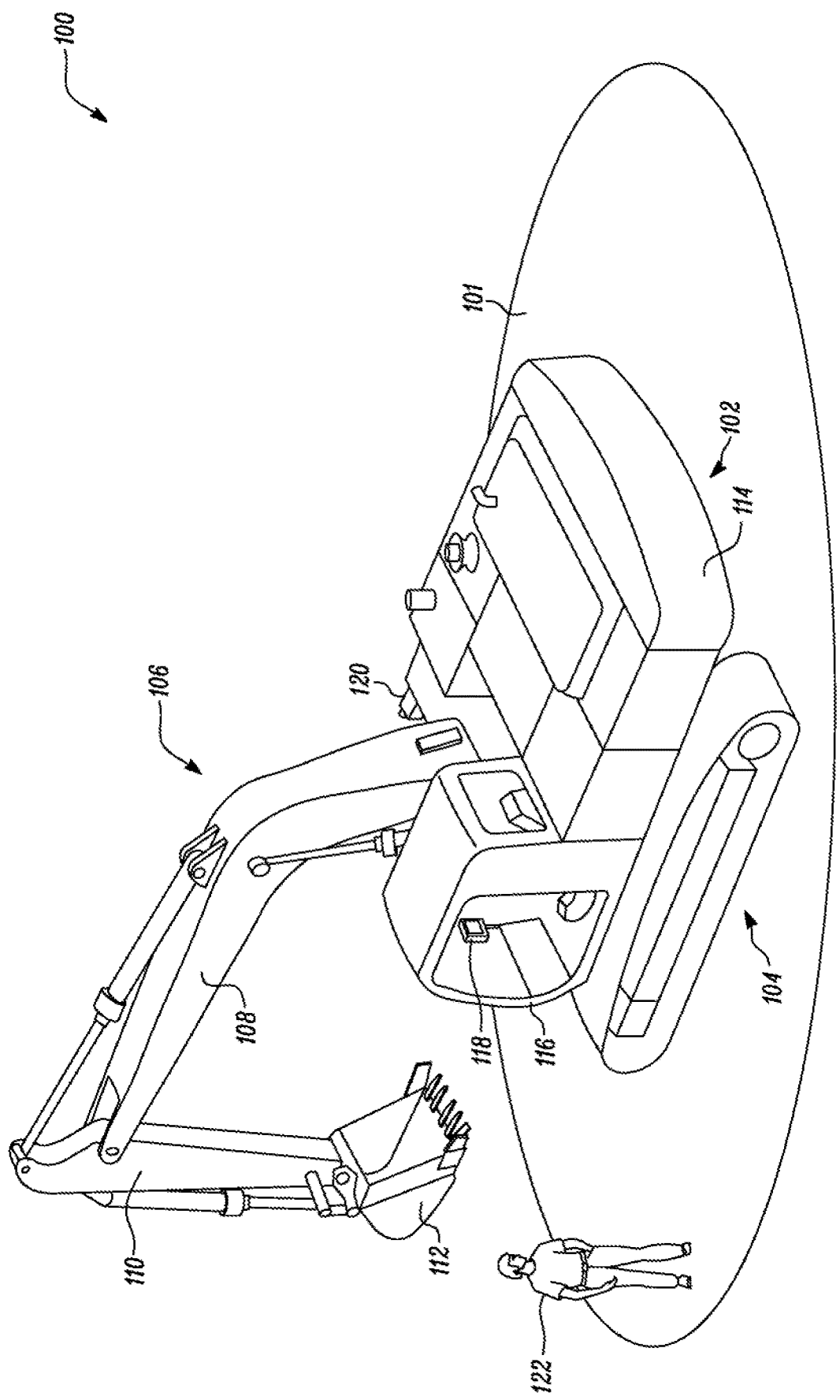
FIG. 1 shows a perspective view of an exemplary machine, according to an aspect of the present disclosure.

Wherever possible, the same reference numbers will be used throughout the drawings to refer to same or like parts. In an embodiment, FIG. 1 shows an exemplary machine 100 at a worksite 101 at which one or more machines 100 may be operating to perform various tasks. Although, the machine 100 is illustrated as a hydraulic excavator, the machine 100 may be any other type of a work machine, which may perform various operations associated with industries such as mining, construction, farming, transportation, landscaping, or the like. Examples of such machines 100 may comprise a wheel loader, a hydraulic shovel, a dozer, and a dump truck, etc. While the following detailed description describes an exemplary aspect with respect to the hydraulic excavator, it should be appreciated that the description applies equally to the use of the present disclosure in other machines as well.

The machine 100 includes an upper swiveling body 102 supported on a ground engaging element 104. Although, the ground engaging element 104 is illustrated as continuous tracks, the ground engaging element 104 may comprise any other kind of ground engaging element such as, for example, wheels, etc. The machine 100 further includes a working mechanism 106 for conducting work, such as, for example, to excavate landsides or otherwise to move material. The working mechanism 106 is an excavating mechanism including a boom 108, an arm 110, and a bucket 112, which serves as a front attachment. Additionally, the upper swiveling body 102 may include a counterweight 114 provided at a tail end. The machine 100 includes an engine (not shown) to provide power to propel the machine 100.

The machine 100 includes an operator station 116 coupled to the upper swiveling body 102. The operator station 116 includes a display 118 and may comprise other levers or controls for operating the machine 100. The machine 100 further includes an image capturing device 120 to capture an image of an environment of the machine 100. In the illustrated embodiment of FIG. 1, only one image capturing device 120 is shown, however, there may be multiple image capturing devices 120 that may be mounted at different locations on the machine 100. The image capturing device 120 may capture the image including a 360-degree view of the environment of the machine 100.

In the illustrated embodiment, the image capturing device 120 is mounted on the upper swiveling body 102. In one embodiment, the image capturing device 120 is a monocular camera. A monocular camera produces a two-dimensional (2D) image and is a bearing only sensor, meaning it does not provide range information for any object within the image.

Embodiments of the image capturing device 120 may comprise cameras that are sensitive to the visual, infrared, or any other portion of the electromagnetic spectrum. In an embodiment, the image capturing device 120 may be a camera capable of capturing both still and moving images. In another embodiment, the image capturing device 120 may comprise a smart camera or a smart vision system having a dedicated on-board processor, including video processing acceleration provided by programmable state array (FPGA), digital signal processor (DSP), general purpose graphics processing unit (GP-GPU), or any other suitable microprocessor with supporting application software. In an embodiment, the image capturing device 120 may be electrically coupled to the display 118 to allow an operator to view the captured image on the display 118.

Further, the worksite 101, on which the machine 100 is operating, may have one or more objects 122. The object 122 may be defined by a set of characteristics such as height, width or other appearance characteristics. In an embodiment, the set of characteristics may be associated with a human. In other embodiments, the set of characteristics may be associated with other objects such as, but not limited to, animals, another machine, vehicle, tree, and a portion of the worksite 101, etc. An operator of the machine 100 may need to be informed of such objects 122 in the worksite 101 by means of an alarm or by displaying a warning on the display 118 of the machine 100.

Figure 2:
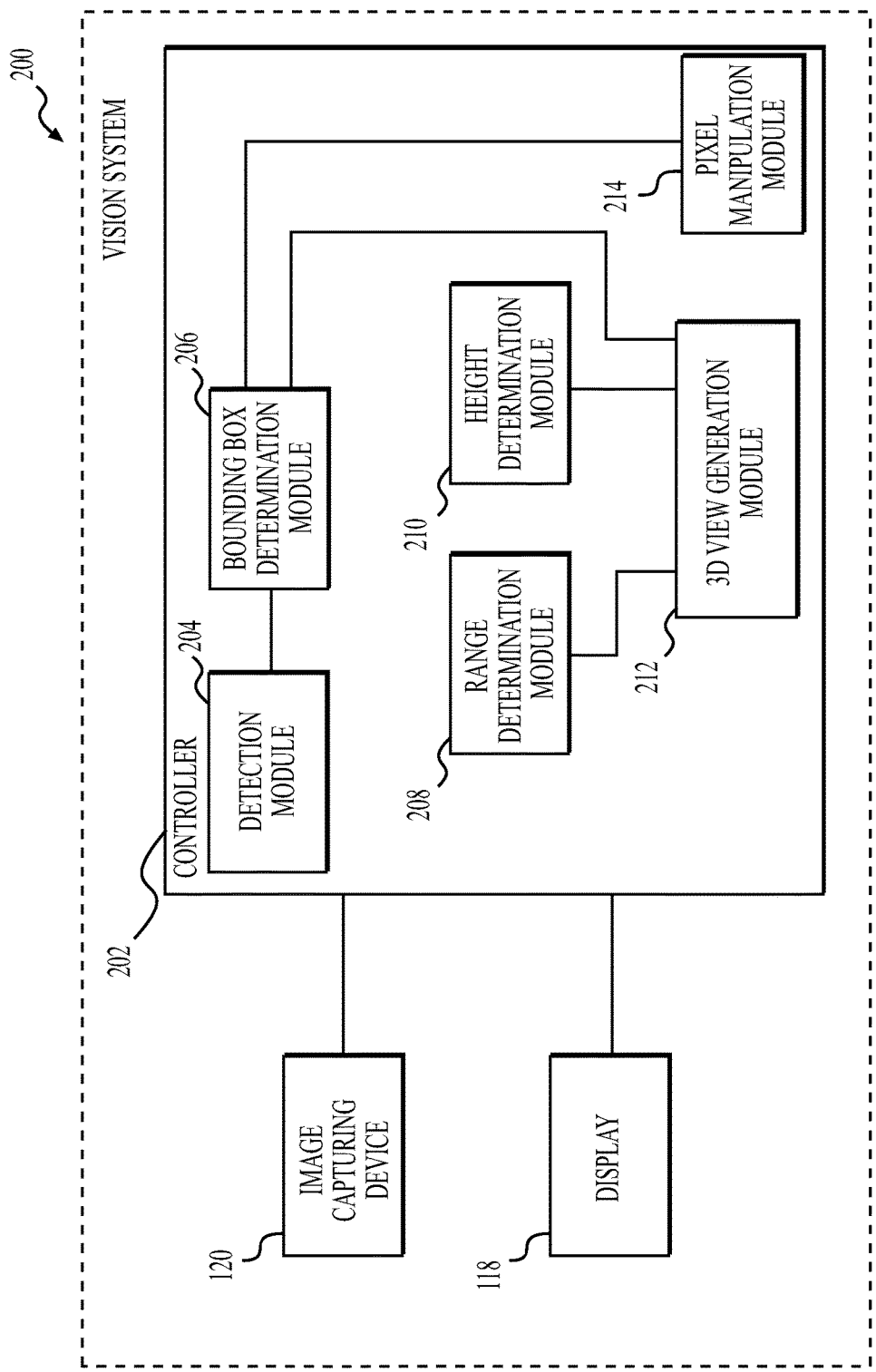
FIG. 2 schematically shows a vision system for assisting an operator of the machine, according to an aspect of the present disclosure.

FIG. 2 schematically illustrates a vision system 200 for assisting the operator of the machine 100. The vision system 200 includes the image capturing device 120 to capture the image of the environment of the machine 100. The vision system 200 further includes a controller 202 to receive the image of the environment of the machine 100, and subsequently process the image to detect the object 122 having the predefined set of characteristics. The controller 202 may further determine a score indicating a probability that the detected object 122 matches the predefined set of characteristics, as explained further in the specification. The vision system 200 also includes the display 118 to display the detected objects 122 to the operator.

The controller 202 includes a detection module 204 which may use conventional object detection processes known in the art to detect a presence of the object 122 in the image. As shown in the exemplary embodiment of FIGS. 3 and 4, the detection module 204 may use sliding-window process to detect the object 122 in an image 302 received through the image capturing device 120. The sliding-window process involves using a rectangular detection window 304 of a predetermined size to begin search from a top left region of the image 302 and then sliding the detection window 304 horizontally and/or vertically to cover all the regions of the image 302. The size of the detection window 304 may be chosen based on the predefined set of characteristics corresponding to the specific type of the object 122 that needs to be detected. For example, when the predefined set of characteristics of the object 122 are associated with a human, the size of the detection window 304 may be chosen based on a typical height of the human.

Figure 3:
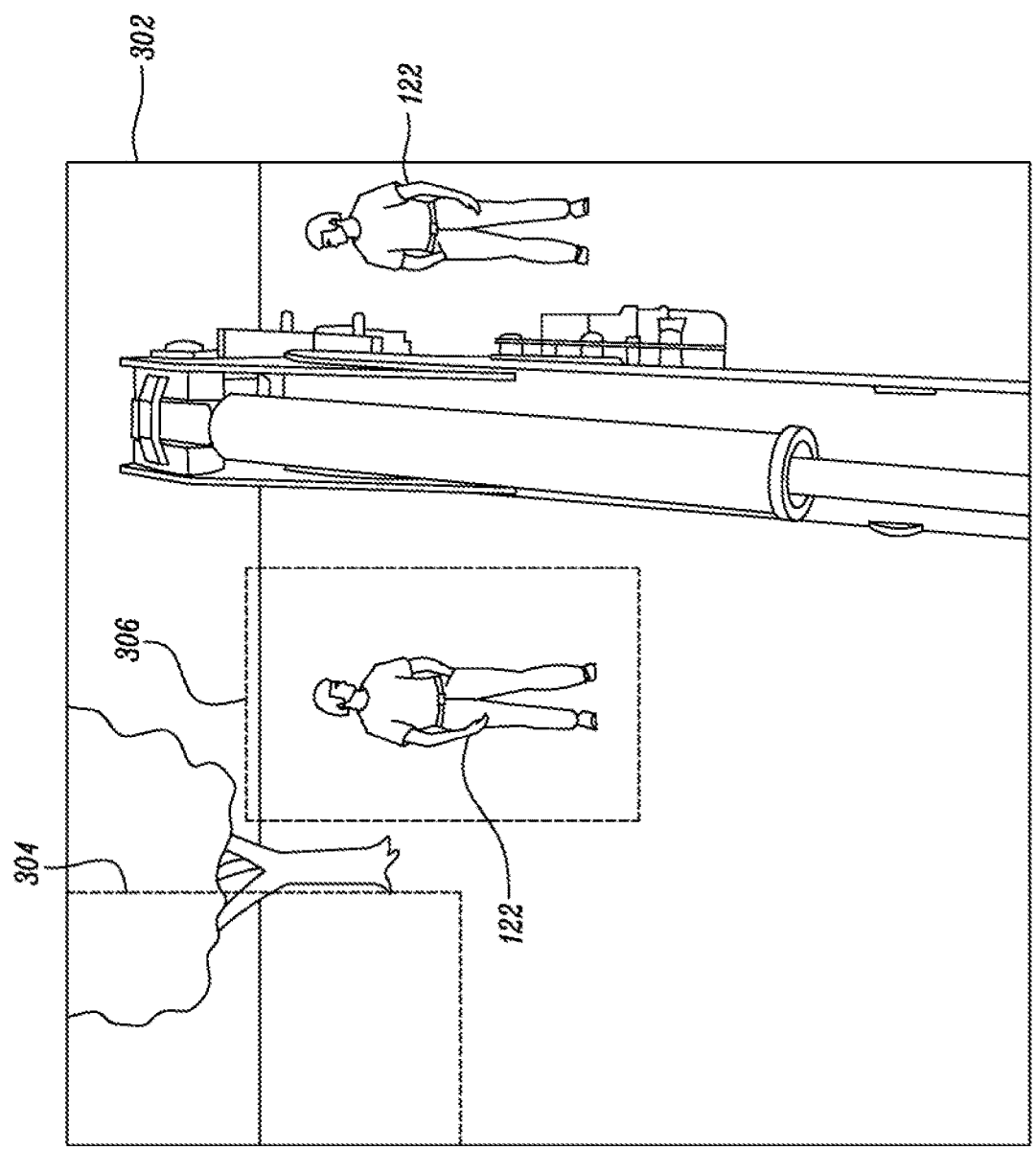
FIG. 3 shows an image of the environment of the machine captured by an image capturing device, according to an aspect of the present disclosure.

The detection module 204 may be further configured to determine a score indicating a probability that the object 122, that is detected in the image 302, matches the predefined set of characteristics. The detection module 204 may use the score to classify the detection windows 304 as relevant or irrelevant depending on whether a detection window 304 including the object 122 matches the predefined set of characteristics or not. FIG. 3 shows a relevant detection window 306 in which the object 122 has been detected.

Figure 4:
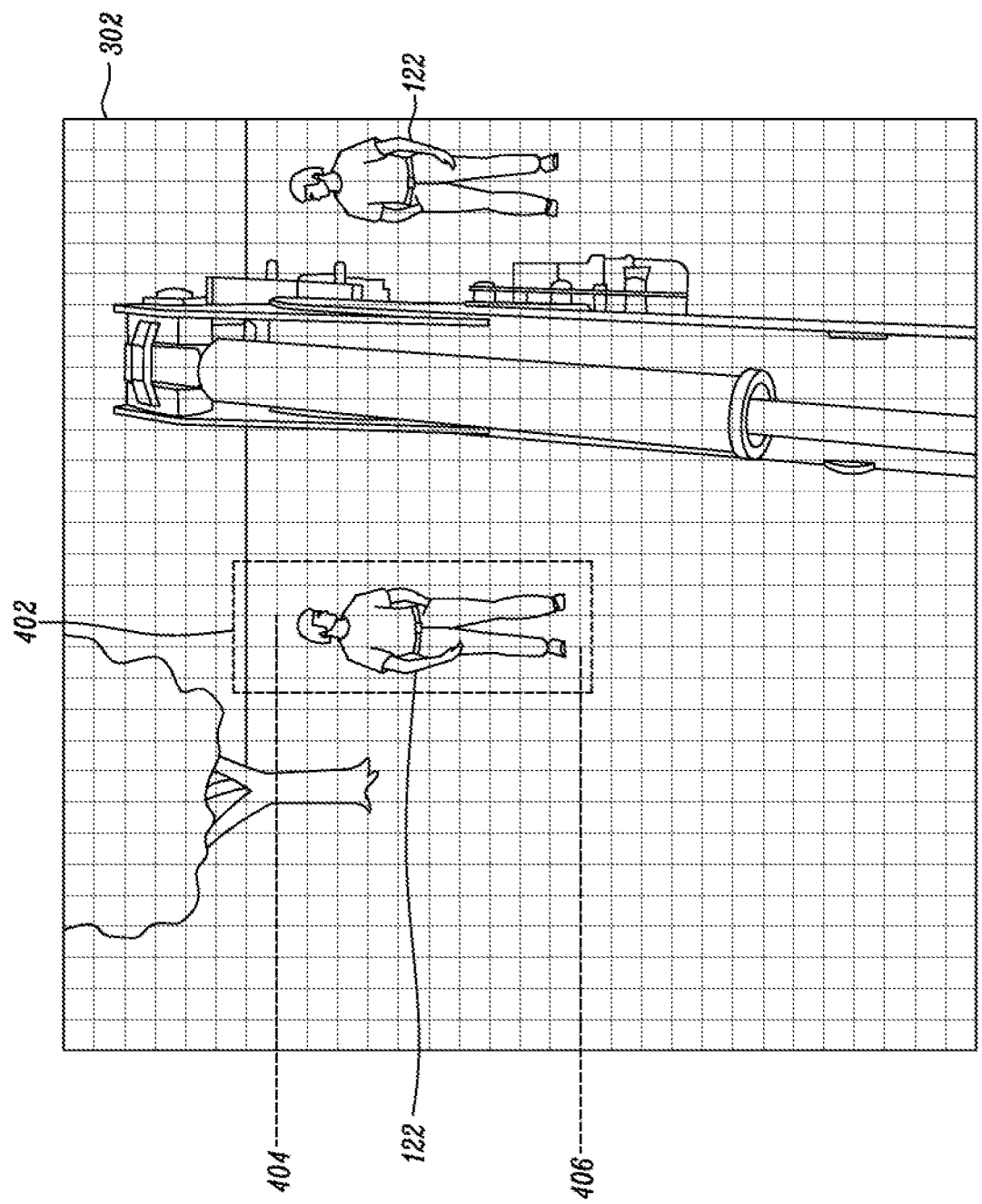
FIG. 4 shows pixels of the image of the environment of the machine captured by the image capturing device, according to an aspect of the present disclosure.

Referring to FIG. 2 and FIG. 4, the controller 202 includes a bounding box determination module 206 configured to determine a bounding box 402 defining the object 122, that is detected in the detection window 306. Subsequently, the bounding box determination module 206 determines a maximum vertical pixel 404, and a minimum vertical pixel 406 based on the bounding box 402. In this example, the image 302 has a pixel resolution of 30×30 resulting in a total of 900 pixels.

Referring to FIG. 2, the controller 202 further includes a range determination module 208 and a height determination module 210 to respectively determine a range and a height of the object 122 detected in the image 302. For determining the height and the range, the range determination module 208 and the height determination module 210 receive one or more internal parameters associated with intrinsic calibration of the image capturing device 120 and one or more external parameters associated with extrinsic calibration of the image capturing device 120.

The intrinsic calibration includes calibration of the image capturing device 120 to calculate the one or more internal parameters such as, a focal length, an optical center, a pixel azimuth angle and a pixel elevation angle, etc. The extrinsic calibration process includes calibration of the image capturing device 120 to calculate the one or more external parameters such as a roll, a pitch, a yaw, an angle of depression with respect to a ground level, a horizontal position, and a vertical position of the image capturing device 120, etc. The calibration may be performed using a checkerboard pattern of known linear dimensions and angular dimensions, placed in a field of view of the image capturing device 120. The image capturing device 120 may also include a calibration software to process the images captured during the calibration. Alternatively, an external calibration software may be used to process the images captured during the calibration.

The range determination module 208 may assume that the object 122 is standing on the ground and accordingly may determine the range of the object 122 using the minimum vertical pixel 406, the one or more internal parameters, and the one or more external parameters. The height determination module 210 is further configured to determine the height of the object 122 detected in the image 302. The height determination module 210 determines the height of the object 122 based on the range, the maximum vertical pixel 404, the minimum vertical pixel 406, the one or more internal parameters, and the one or more external parameters. In various embodiments, the controller 202 determines the height and the range of the object 122 using different object detection processes and compare the findings to identify wrongly detected objects. This helps in reducing the false alarms of object detection. The detected objects 122 are presented to the operator monitoring the environment of the machine 100.

Referring to FIG. 2, the controller 202 includes a 3D view generation module 212 to generate a three-dimensional (3D) view of the environment of the machine 100. The 3D view generation module 212 is configured to generate the 3D view by transforming the image 302 to reflect a different vantage point. A person of ordinary skill in the art will recognize that there are numerous known techniques for performing such transformations. In one embodiment, the 3D view generation module 212 projects the image 302 on a horizontal plane and a vertical plane. Various known projection techniques such as cylindrical projection, multi-planar projection, etc. may be used to generate the 3D view.

The 3D view allows greater visibility to the operator monitoring the environment of the machine 100. Specifically, the objects 122 detected in the environment of the machine 100 are shown in the 3D view to allow better understanding of their location and relative positioning with respect to other objects. The 3D view also helps the operator in perceiving the depth of the objects 122. However, while transforming the image 302 to generate the 3D view, the contents of the image 302 often get distorted. For example, one or more vertical objects may look distorted and/or a long shadow of the objects 122 may be visible in the 3D view. One or more distortion correction techniques known in the art may be applied to correct the distortion artifacts caused due to the projection. Further, the shadow of the object 122 may be replaced with a dark shadow so that it looks like an actual shadow of the object 122.

To further improve the representation of the objects 122 in the 3D view, the pixels of the object 122 are extracted from the image 302 and reinserted in the 3D view generated by the 3D view generation module 212. Referring to FIG. 2, the controller 202 includes a pixel manipulation module 214 to extract one or more pixels of the object 122 from the bounding box 402. In one embodiment, the pixel manipulation module 214 extracts only the pixels corresponding to the object 122 and removes the background pixels from the bounding box 402.

Figure 5:
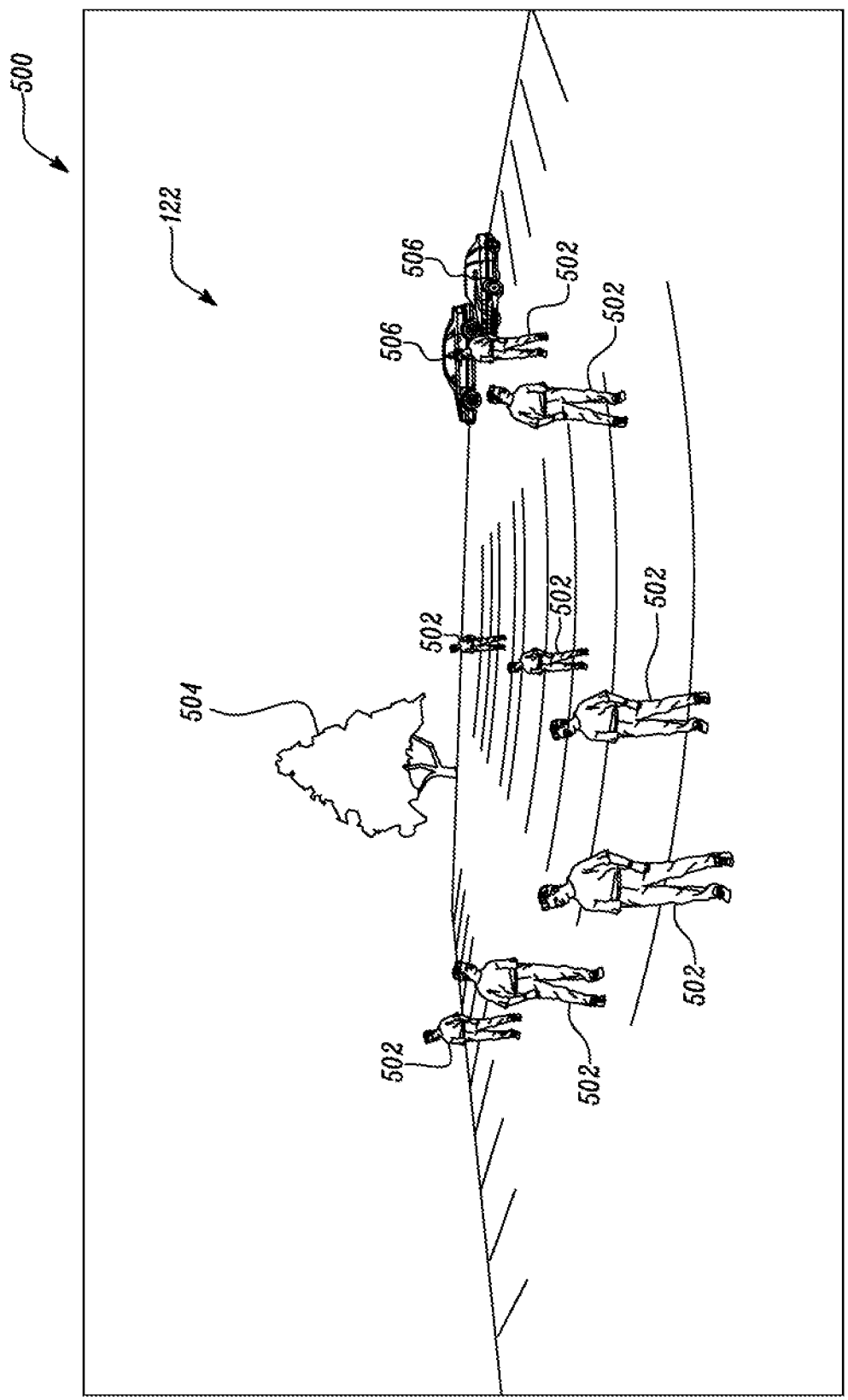
FIG. 5 illustrates another image of the environment of the machine captured by an image capturing device, according to an aspect of the present disclosure.
Figure 6:
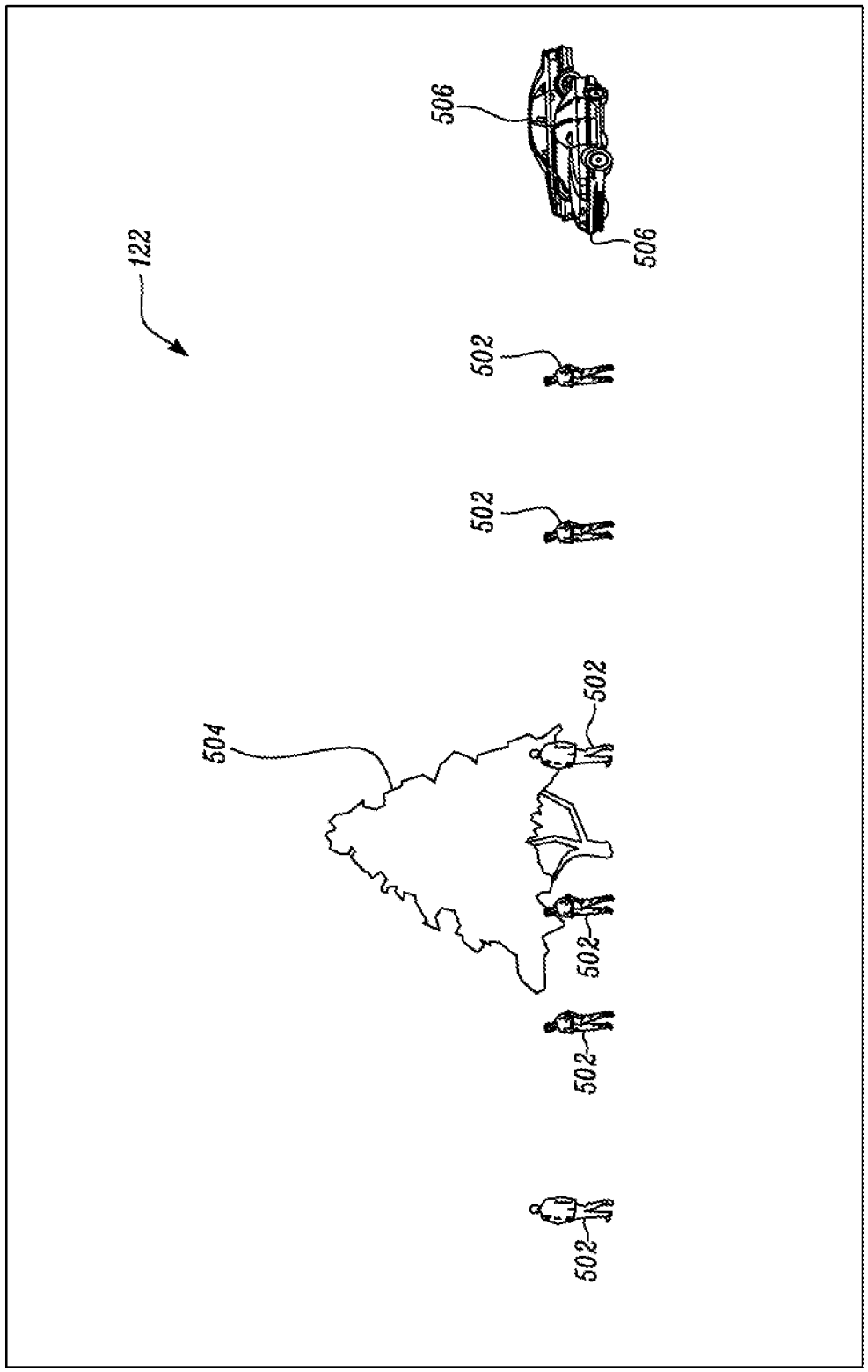
FIG. 6 illustrates pixels of the objects extracted from the image of the environment of the machine, according to an aspect of the present disclosure.

FIG. 5 illustrates an image 500 of the environment of the machine 100 in accordance with an example embodiment of the present disclosure. The image 500 is a two-dimensional image captured by the image capturing device 120. The image 500 includes objects 122 such as people 502, a tree 504, and cars 506 which are present in the environment of the machine 100. FIG. 6 illustrates the objects 122 extracted from the image 500 in accordance with an example embodiment of the present disclosure. The pixel manipulation module 214 extracts the pixels corresponding to each of the detected objects 122 from the image 500. The extracted pixels are used to enhance the appearance of the objects in the 3D view.

Figure 7:
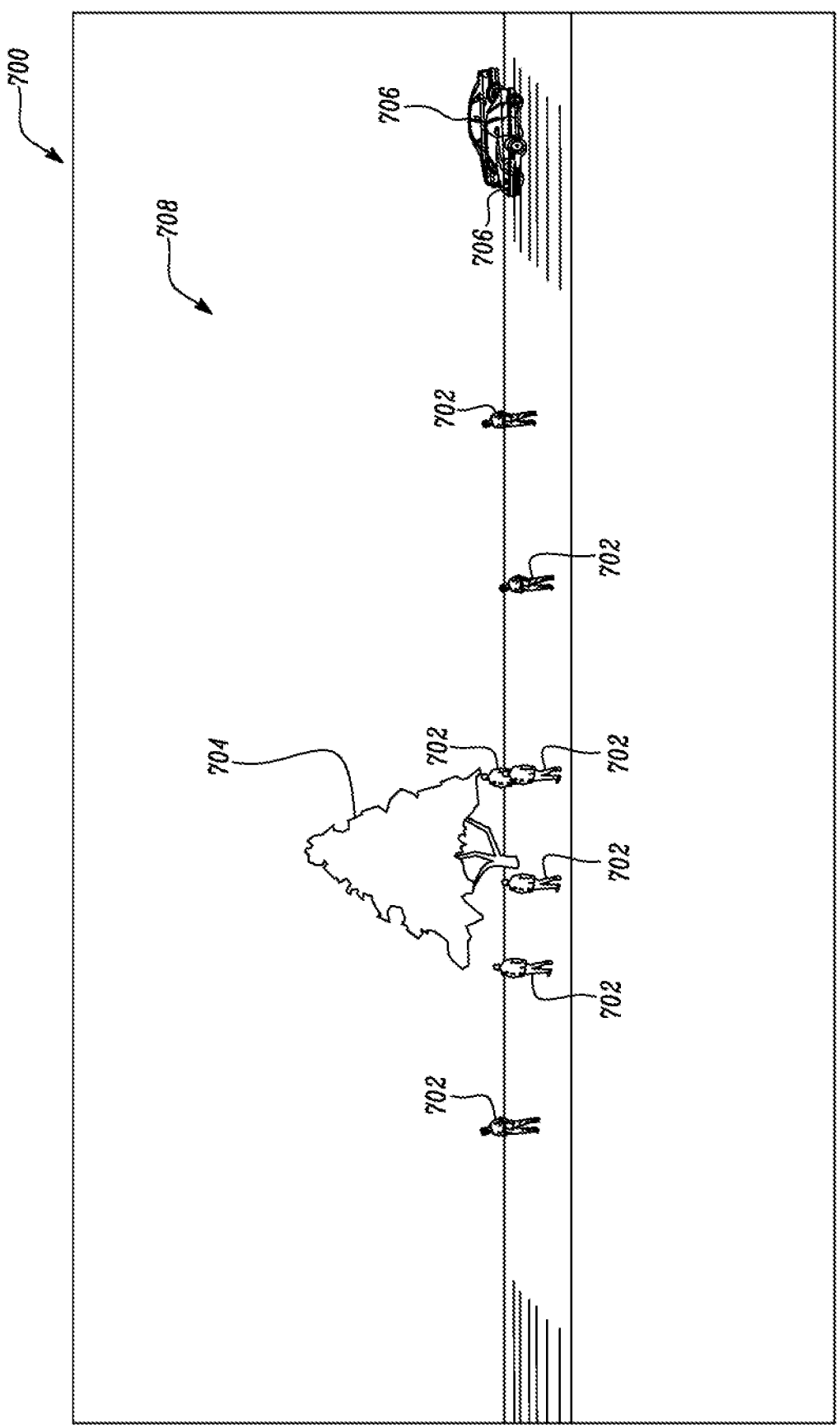
FIG. 7 illustrates a front view of the environment of the machine, according to an aspect of the present disclosure.

Specifically, the 3D view generation module 212 is configured to reinsert the extracted pixels of the objects 122 in the 3D view. The extracted pixels are reinserted in the 3D view as a vertical 'pop-up' element with respect to the ground plane. FIG. 7 illustrates a front view 700 generated from the 3D view of the environment of the machine 100 in accordance with an example embodiment of the present disclosure. The front view 700 includes enhanced objects 708 such as people 702, the tree 704, and cars 706 that are represented as vertical pop-up elements with respect to the ground plane. Specifically, the pixels corresponding to the enhanced objects 708 are extracted from the image 500 and reinserted as vertical pop-up elements at their respective locations in the front view 700. Vertical pop-up representation of the enhanced objects 708 greatly improves the 3D view and allows better monitoring of the environment of the machine 100 by the operator.

Figure 8:
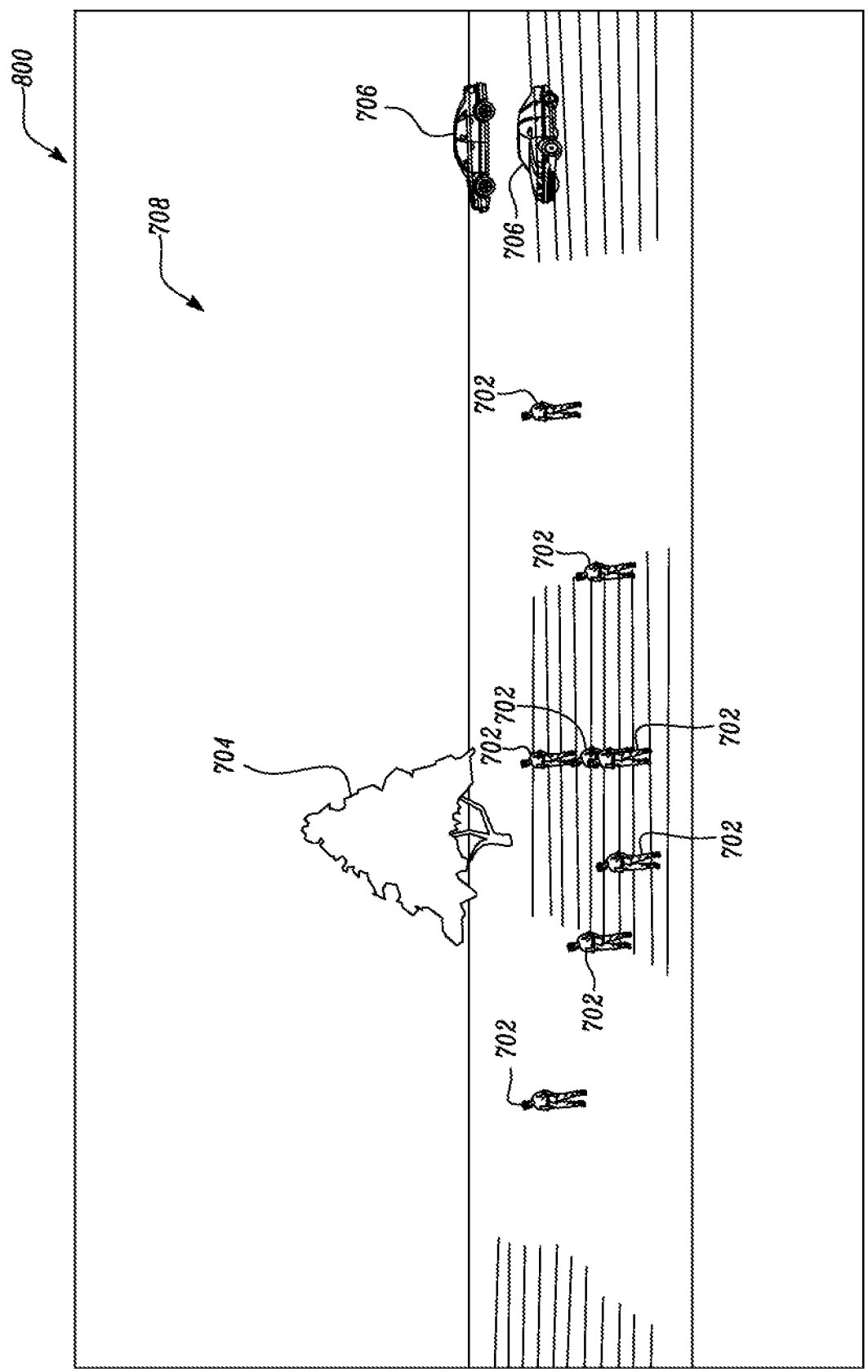
FIG. 8 illustrates another front view of the environment of the machine, according to an aspect of the present disclosure.

Referring to FIG. 2, the controller 202 is communicably coupled to the display 118 to allow the operator to visualize the 3D view. As a result of inserting the vertical pop-up elements, the operator would be able to effectively understand the size of the enhanced objects 708 and perceive their depth in the 3D view. The 3D view may be rotated by the operator and viewed from various viewpoints such as overhead view, front view, side view, etc. FIG. 8 illustrates another front view 800 generated from the 3D view of the environment of the machine 100 in accordance with an example embodiment of the present disclosure.

Figure 9:
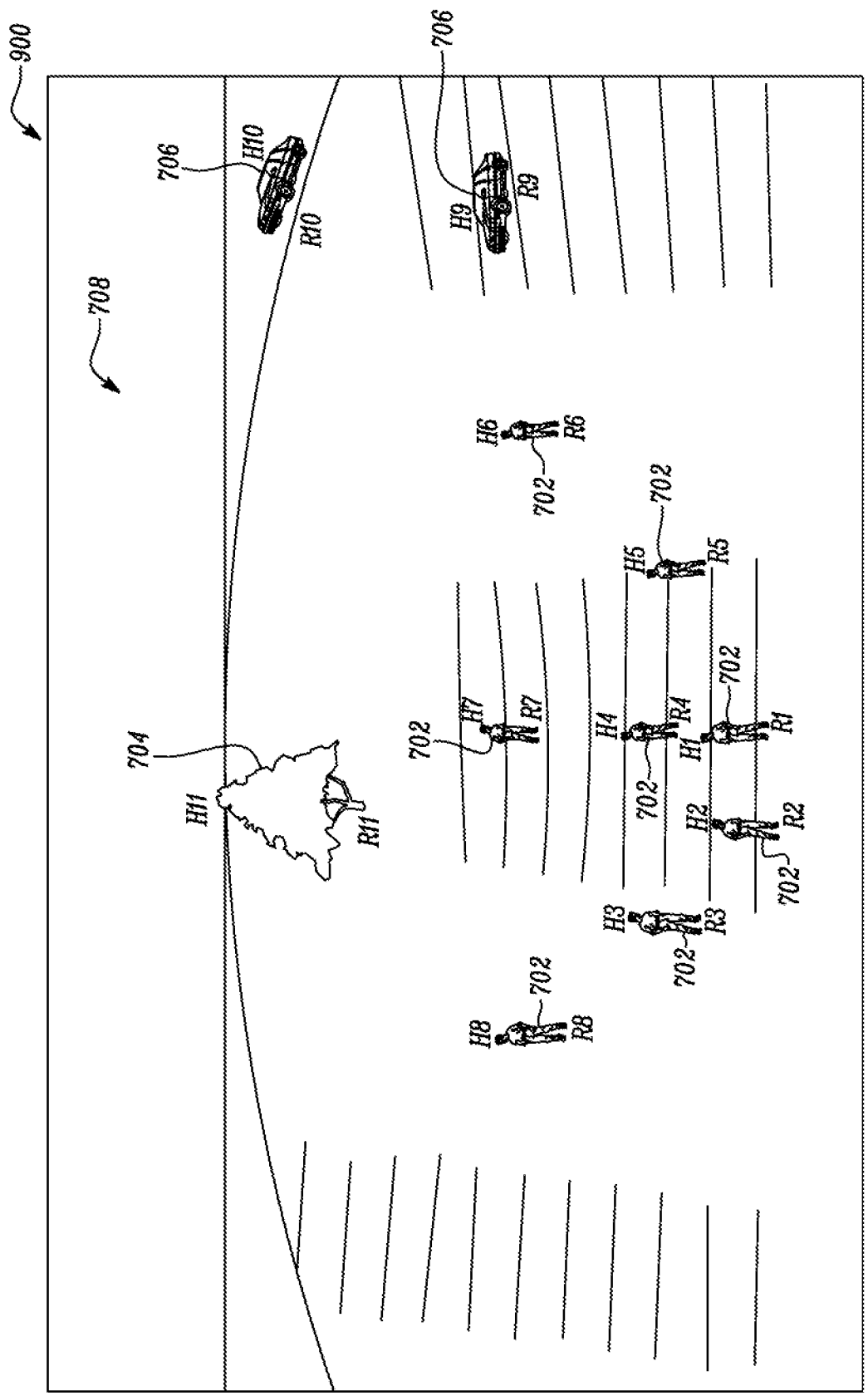
FIG. 9 illustrates an overhead view of the environment of the machine, according to an aspect of the present disclosure.

To assist the operator, the controller 202 may be configured to further enhance the 3D view by displaying the height and the range information of the enhanced objects 708 in the 3D view. FIG. 9 illustrates an overhead view 900 generated from the 3D view of the environment of the machine 100 in accordance with an example embodiment of the present disclosure. In this example, all of the enhanced objects 708 are shown with their height and range information overlaid near the top and the bottom of the objects respectively. This allows the operator to understand the size and the location of the enhanced objects 708 and their relative positioning with respect to other enhanced objects 708.

Figure 10:
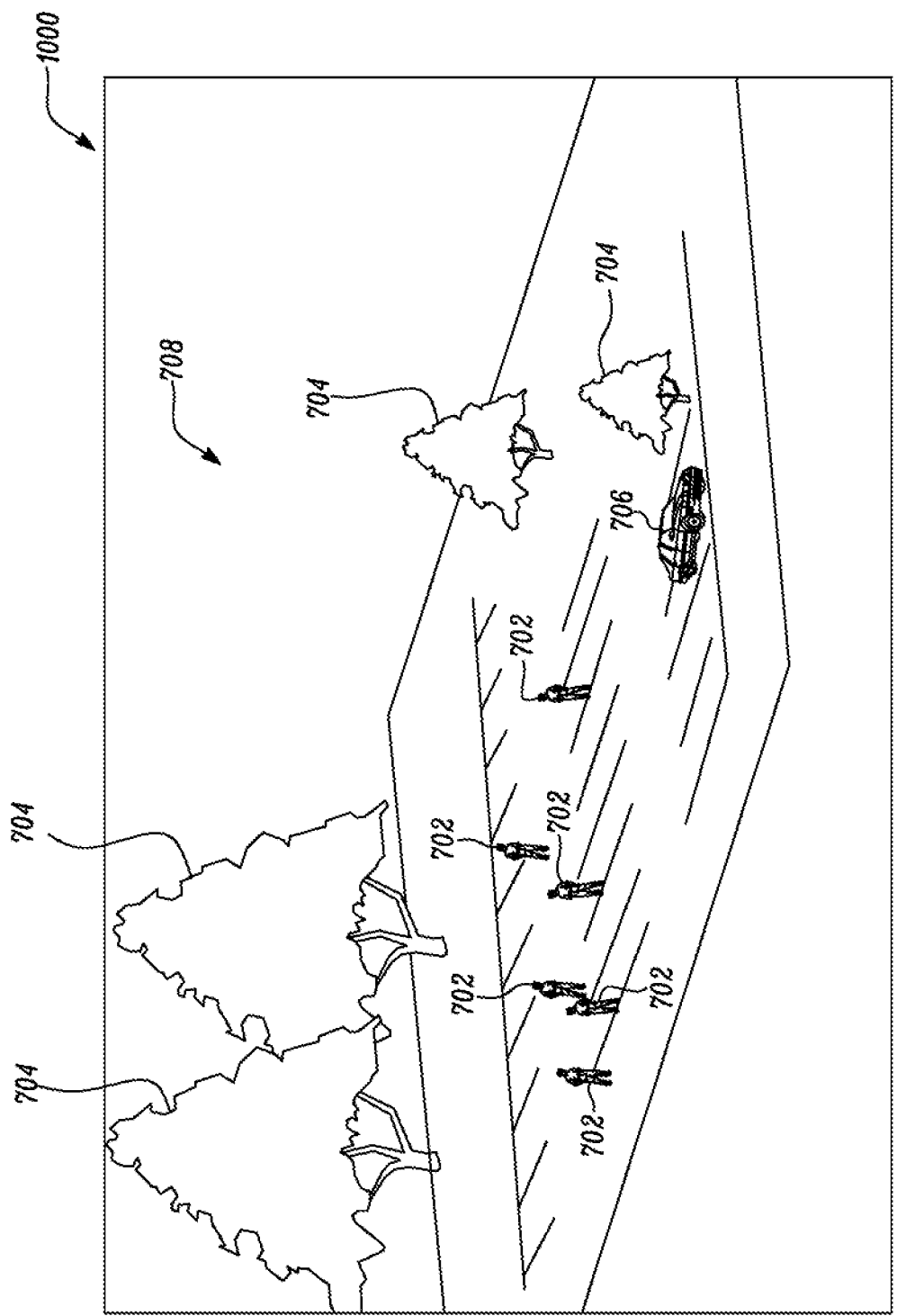
FIG. 10 illustrates a side view of the environment of the machine, according to an aspect of the present disclosure.

FIG. 10 illustrates a side view 1000 generated from the 3D view of the environment of the machine 100 in accordance with an example embodiment of the present disclosure. The side view 1000 allows the operator to perceive depth of the enhanced objects 708.

The 3D view may also be used for teleoperation of the machine 100 allowing line-of-sight and non-line-of-sight remote control of the machine 100. In one embodiment, the display 118 is provided with user interface controls (not shown) to enable the operator to rotate the 3D view and allow visualization from different viewpoints. In various other embodiments, the display 118 may be communicably coupled to a remote system configured to remotely monitor the environment of the machine 100.

In various embodiments, the 3D view can be used to inform the operator about the environment of the machine 100. The controller 202 may be configured to alert the operator of the machine 100 by sending a warning when one or more enhanced objects 708 are in proximity of the machine 100. The warning may include an audio warning or a visual warning on the display 118. In an example, when the controller 202 detects the enhanced object 708 at a distance less than a predetermined threshold distance, the audio warning may announce to the operator that the enhanced object 708, that is detected, in the image 302, is in vicinity of the machine 100 and ask the operator to take necessary actions. In one embodiment, the controller 202 may alert the operator by highlighting the enhanced object 708 on the display 118 when the enhanced object 708 is in vicinity of the machine 100. In another embodiment, the controller 202 may alert the operator by flashing the enhanced object 708 on the display 118. The visual warning may show the information about the presence of the enhanced object 708 along with the distance of the enhanced object 708 from the machine 100.

The controller 202 may be a single microprocessor or multiple microprocessors that include components for performing functions consistent with the present disclosure. Numerous commercially available microprocessors can be configured to perform the functions of the controller 202 disclosed herein. It should be appreciated that the controller 202 could readily be embodied in a general-purpose microprocessor capable of controlling numerous functions associated with each of the devices present in the machine 100. The controller 202 may also include a memory, a secondary storage device, and any other components for running an application. Various circuits may be associated with the controller 202 such as power supply circuitry, a solenoid driver circuitry, a signal conditioning circuitry for e.g., an analog-to-digital converter circuitry, and other types of circuitry. Various routines, algorithms, and/or programs can be programmed within the controller 202 for execution thereof. Moreover, it should be noted that the controller 202 disclosed herein may be a stand-alone controller 202 or may be configured to co-operate with existing processors, for example, an electronic control module (ECM) (not shown) provided in the machine 100 to perform functions that are consistent with the present disclosure.

INDUSTRIAL APPLICABILITY

Figure 11:
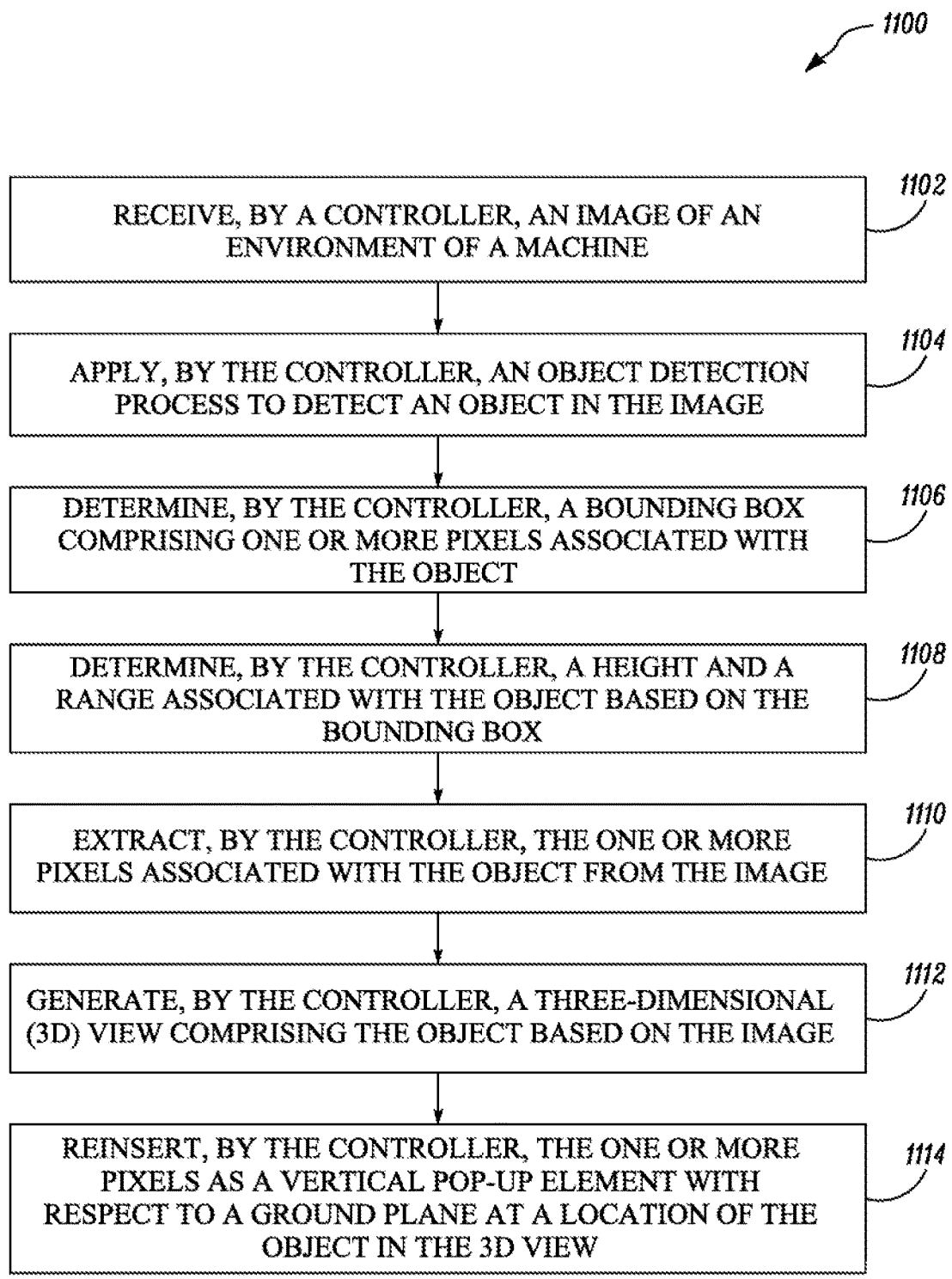
FIG. 11 shows a flow chart of a method of assisting the operator of the machine based on the image of the environment of the machine, according to an aspect of the present disclosure.

The present disclosure provides a method 1100 to assist the operator of the machine 100 based on the image of the environment of the machine 100 captured by the image capturing device 120, as shown in FIG. 11. Specifically, the method 1100 generates a 3D view of the environment of the machine 100 where the objects 122 are represented by enhanced objects 708. The 3D view allows the operator to visualize the environment of the machine 100 from different viewpoints such as overhead, front, side, etc. The 3D view helps the operator in understanding the size and the location of the enhanced objects 708 and their relative positioning with respect to the other enhanced objects 708.

The image capturing device 120 captures the image 302 of the environment of the machine 100. The image capturing device 120 may be a monocular camera. In block 1102, the controller 202 receives the image 302 of the environment of the machine 100. In block 1104, the controller 202 applies the object detection process to detect the object 122 in the image 302 captured by the image capturing device 120. In one embodiment, the object detection process is a sliding window detection process. The image capturing device 120 is calibrated using the processes known in the art and the calibration parameters are determined. In block 1106, the controller 202 determines the bounding box 402 comprising one or more pixels associated with the object 122. In block 1108, the controller 202 determines the height and the range associated with the object 122 based on the bounding box 1102 and the calibration parameters of the image capturing device 120.

In block 1110, the controller 202 extracts the one or more pixels associated with the object 122 from the image 302. In block 1112, the controller 202 generates the 3D view based on the image 302. In block 1114, the controller 202 reinserts the one or more pixels as the vertical pop-up elements with respect to the ground plane at a location of the object 122 in the 3D view. The controller 202 is communicably coupled to the display 118 to allow the operator to visualize the 3D view comprising the enhanced objects 708. The 3D view may be rotated by the operator and viewed from various viewpoints. As a result of vertical pop-up element representation, the operator would be able to effectively understand the size of the enhanced objects 708 and perceive their depth in the 3D view.

Figure 12:
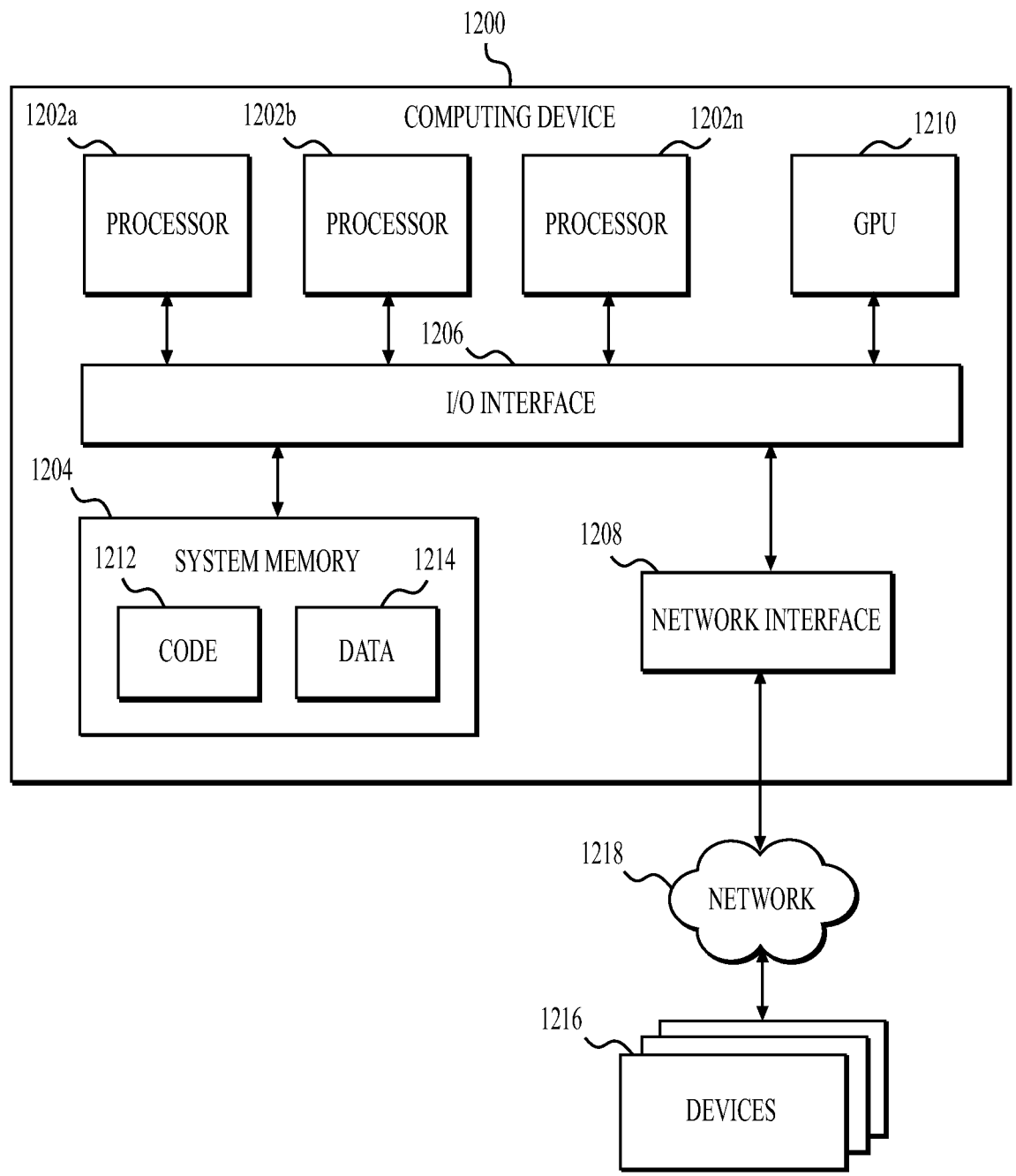
FIG. 12 illustrates a general-purpose computer system, according to an aspect of the present disclosure.

FIG. 12 depicts a general-purpose computer system that includes or is configured to access one or more computer-accessible media. In the illustrated aspect, a computing device 1200 may include one or more processors 1202 *a*, 1202 *b*, and/or 1202 *n*, (which may be referred herein singularly as the processor 1202 or in the plural as the processors 1202) coupled to a system memory 1204 via an input/output (I/O) interface 1206. The computing device 1200 may further include a network interface 1208 coupled to the I/O interface 1206.

In various aspects, the computing device 1200 may be a uniprocessor system including one processor 1202 or a multiprocessor system including several processors 1202 (e.g., two, four, eight, or another suitable number). The processors 1202 may be any suitable processors capable of executing instructions. For example, in various aspects, the processor(s) 1202 may be general-purpose or embedded processors implementing any of a variety of instruction set architectures (ISAs), such as the x86, PowerPC, SPARC, or MIPS ISAs, or any other suitable ISA. In multiprocessor systems, each of the processors 1202 may commonly, but not necessarily, implement the same ISA.

In some aspects, a graphics processing unit ("GPU") 1210 may participate in providing graphics rendering and/or physics processing capabilities. A GPU may, for example, include a highly parallelized processor architecture specialized for graphical computations. In some aspects, the processors 1202 and the GPU 1210 may be implemented as one or more of the same type of device.

The system memory 1204 may be configured to store instructions and data accessible by the processor(s) 1202. In various aspects, the system memory 1204 may be implemented using any suitable memory technology, such as static random access memory ("SRAM"), synchronous dynamic RAM ("SDRAM"), nonvolatile/Flash®-type memory, or any other type of memory. In the illustrated aspect, program instructions and data implementing one or more desired functions, such as those methods, techniques and data described above, are shown stored within the system memory 1204 as code 1212 and data 1214.

In one aspect, the I/O interface 406 may be configured to coordinate I/O traffic between the processor(s) 1202, the system memory 1204 and any peripherals in the device, including a network interface 1208 or other peripheral interfaces. In some aspects, the I/O interface 1206 may perform any necessary protocol, timing or other data transformations to convert data signals from one component (e.g., the system memory 1204) into a format suitable for use by another component (e.g., the processor 1202). In some aspects, the I/O interface 1206 may include support for devices attached through various types of peripheral buses, such as a variant of the Peripheral Component Interconnect (PCI) bus standard or the Universal Serial Bus (USB) standard, for example. In some aspects, the function of the I/O interface 1206 may be split into two or more separate components, such as a north bridge and a south bridge, for example. Also, in some aspects, some or all of the functionality of the I/O interface 1206, such as an interface to the system memory 1204, may be incorporated directly into the processor 1202.

The network interface 1208 may be configured to allow data to be exchanged between the computing device 1200 and other device or devices 1216 attached to a network or networks 1218, such as other computer systems or devices, for example. In various aspects, the network interface 1208 may support communication via any suitable wired or wireless general data networks, such as types of Ethernet networks, for example. Additionally, the network interface 1208 may support communication via telecommunications/telephony networks, such as analog voice networks or digital fiber communications networks, via storage area networks, such as Fibre Channel SANs (storage area networks), or via any other suitable type of network and/or protocol.

In some aspects, the system memory 1204 may be one aspect of a computer-accessible medium configured to store program instructions and data as described above for implementing aspects of the corresponding methods and apparatus. However, in other aspects, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device the 1200 via the I/O interface 1206. A non-transitory computer-accessible storage medium may also include any volatile or non-volatile media, such as RAM (e.g., SDRAM, DDR SDRAM, RDRAM, SRAM, etc.), ROM, etc., that may be included in some aspects of the computing device 1200 as the system memory 1204 or another type of memory. Further, a computer-accessible medium may include transmission media or signals, such as electrical, electromagnetic or digital signals, conveyed via a communication medium, such as a network and/or a wireless link, such as those that may be implemented via the network interface 1208. Portions or all of multiple computing devices, such as those illustrated in FIG. 12, may be used to implement the described functionality in various aspects; for example, software components running on a variety of different devices and servers may collaborate to provide the functionality. In some aspects, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A vision system for assisting an operator of a machine, the vision system comprising:
   an image capturing device mounted on the machine, the image capturing device configured to capture an image of an environment of the machine;
   a controller communicably coupled to the image capturing device, the controller configured to: apply an object detection process to detect an object in the image;
   determine a bounding box comprising two or more pixels associated with the object, wherein the two or more pixels include at least a maximum vertical pixel and a minimum vertical pixel of the object in the bounding box;
   determine a height and a range associated with the object based on the bounding box; extract the two or more pixels within the bounding box;
   generate a three-dimensional (3D) view comprising the object based on the image captured by the image capturing device; and
   reinsert the two or more pixels as a vertical pop-up element with respect to a ground plane at a location of the object in the 3D view; and
   display communicably coupled to the controller, the display configured to display the 3D view comprising the object to the operator of the machine.

2. The vision system of claim 1, wherein the controller is configured to apply sliding-window detection process to detect the object in the image.

3. The vision system of claim 1, wherein the controller is configured to determine the height and the range associated with the object based on the bounding box and calibration parameters of the image capturing device.

4. The vision system of claim 1, wherein the controller is configured to generate the 3D view by projecting the image onto a horizontal plane and/or a vertical plane.

5. The vision system of claim 1, wherein the controller is configured to display the height and the range associated with the object in the 3D view.

6. The vision system of claim 1, wherein the controller is further configured to alert the operator in case the object is detected at a distance less than a threshold distance from the machine.

7. The vision system of claim 6, wherein the controller is configured to alert the operator by highlighting the object displayed on the display.

8. The vision system of claim 1, wherein the display is provided with user interface controls to enable the operator to rotate the 3D view and allow visualization from different viewpoints.

9. The vision system of claim 1, wherein the display is communicably coupled to a remote system allowing remote monitoring of the environment of the machine.

10. A method of assisting an operator of a machine based on an image of an environment of the machine captured by an image capturing device mounted on the machine, the method comprising:
receiving, by a controller, the image of the environment of the machine;
applying, by the controller, an object detection process to detect an object in the image;
determining, by the controller, a bounding box comprising two or more pixels associated with the object, wherein the two or more pixels include at least a maximum vertical pixel and a minimum vertical pixel of the object in the bounding box;
determining, by the controller, a height and a range associated with the object based on the bounding box;
extracting, by the controller, the two or more pixels associated with the object from the image;
generating, by the controller, a three-dimensional (3D) view comprising the object based on the image captured by the image capturing device; and
reinserting, by the controller, the two or more pixels as a vertical pop-up element with respect to a ground plane at a location of the object in the 3D view.

11. The method of claim 10, wherein applying the object detection process comprises applying sliding-window detection process to detect the object in the image.

12. The method of claim 10, wherein determining the height and the range comprises determining the height and the range associated with the object based on the bounding box and calibration parameters of the image capturing device.

13. The method of claim 10, wherein generating the 3D view comprises projecting the image onto a horizontal plane and/or a vertical plane.

14. The method of claim 10 further comprising displaying the height and the range associated with the object in the 3D view.

15. The method of claim 10 further comprising alerting the operator in case the object is detected at a distance less than a threshold distance from the machine.

16. The method of claim 15, wherein alerting the operator comprises alerting the operator by highlighting the object displayed on the display.

17. The method of claim 10, wherein displaying the 3D view, further comprises providing user interface controls. to enable the operator to rotate the 3D view and allow visualization from different viewpoints.

18. The method of claim 10, wherein displaying the 3D view further comprises displaying the 3D view on a remote system allowing remote monitoring of the environment of the machine.

19. The method of claim 10, wherein generating the 3D view further comprises correcting the 3D view to remove distortions.

20. A computer-program product for use in conjunction with an image capturing device and a display, wherein the image capturing device is configured to capture an image of an environment of a machine, the computer-program product comprising a non-transitory computer-readable storage medium having instructions for causing a processor to:
apply an object detection process to detect an object in the image;
determine a bounding box comprising two or more pixels associated with the object, wherein the two or more pixels include at least a maximum vertical pixel and a minimum vertical pixel of the object in the bounding box;
determine a height and a range associated with the object based on the bounding box;
extract the two or more pixels associated with the object from the image;
generate a three-dimensional (3D) view comprising the object based on the image captured by the image capturing device; and
reinsert the two or more pixels as a vertical pop-up element with respect to a ground plane at a location of the object in the 3D view.

* * * * *